United States Patent [19]
Leore

[11] Patent Number: 5,421,100
[45] Date of Patent: Jun. 6, 1995

[54] TAPE MEASURE ATTACHMENT

[76] Inventor: John E. Leore, 1327 North Shore Drive, Sudbury, Ontario, Canada, P3B 1E7

[21] Appl. No.: 102,097

[22] Filed: Aug. 6, 1993

[30] Foreign Application Priority Data

Aug. 7, 1992 [CA] Canada .................................. 2075528

[51] Int. Cl.$^6$ .............................................. G01B 3/10
[52] U.S. Cl. ........................................ 33/770; 33/758; 33/759
[58] Field of Search ................. 33/770, 758, 759, 760, 33/768, 42

[56] References Cited

U.S. PATENT DOCUMENTS

| | | | |
|---|---|---|---|
| 2,396,877 | 3/1946 | Peterson | 33/770 |
| 2,591,333 | 4/1952 | Bellmer | 33/770 |
| 3,210,850 | 10/1965 | Grzyb | 33/759 |
| 3,744,134 | 7/1973 | Zima, Jr. | 33/768 |
| 4,603,481 | 8/1986 | Cohen et al. | 33/768 |
| 4,845,858 | 7/1989 | Thomas | 33/759 |
| 5,172,486 | 12/1992 | Waldherr | 33/770 |

FOREIGN PATENT DOCUMENTS

| | | | |
|---|---|---|---|
| 0104201 | 8/1981 | Japan | 33/758 |
| 0120902 | 7/1984 | Japan | 33/758 |

*Primary Examiner*—Christopher W. Fulton
*Attorney, Agent, or Firm*—Browdy and Neimark

[57] ABSTRACT

A tape measurement attachment to facilitate accurate layout of pencil lines at any desired framing multiple is disclosed. The tape measure attachment is adapted to be secured to a tab end portion of a tape measure for the purpose of shortening the tape measure by a preselected length. The attachment comprises a spacer adapted to engage the tab end portion of the tape measure and fastening means for detachably securing and holding the spacer to the tape measure tab end portion.

11 Claims, 2 Drawing Sheets

TAPE MEASURE ATTACHMENT

This invention relates to the field of carpentry and more particularly pertains to a new device adapted to be attached to the end of a standard tape measure to facilitate accurate layout of pencil lines at any desired framing multiple eg 12", 16", 24", etc.

The accurate laying out and centering by a carpenter of framing members requires considerable expertise and the use of certain tools such as a carpenter's square. Even a slight error associated with the movement and repositioning of the square for marking of framing members will be compounded to a much larger error after a number of movements. The laying of framing members with accuracy using a tape measure must also be performed with skill as a nail is required to be driven through a line on one board into the center of another board which has no center mark and is subject to vibration and movement due to hammering.

Irregularities in the positioning of a framing joist, stud or rafter member or the building of walls out of square can seriously affect the structure of an entire building. Furthermore, standardized sheeting and insulation will not fit.

Although measuring tapes having markings on one surface corresponding to a specific stud framing multiple have been previously described, such as in U.S. Pat. No. 2,627,117 to Kragness and U.S. Pat. No. 2,778,118 to Manville, they do not provide a solution to the problem as considerable skill and expertise is still required for the accurate laying of framing members.

There is therefore a need for a device that will simplify frame construction and reduce the skill and expertise required to position framing members with accuracy.

It is therefore an object of the present invention to provide a novel device which has the advantage of simplifying the laying out and centering of framing members with accuracy.

The invention accordingly provides an attachable device that can be engaged to and onto which may be placed the tab end of any standard tape measure and that will shorten the tape measure by a pre-selected distance (eg. half the thickness of a framing member) thereby simplifying the positioning and centering with accuracy of framing members so as to provide uniform spacing, according to any framing multiple. It is a further object of the invention to provide a device of this nature that is of simple design, easy to manufacture, inexpensive, efficient and durable.

The present invention provides a tape measure attachment adapted to be secured to a tab end portion of a tape measure for the purpose of shortening the tape measure by a pre-selected length, comprising a spacer with a generally upper tape measure end engaging surface, a generally forwardly disposed tape measure tab engaging surface and generally rearwardly disposed work abutting surface; and fastening means for detachably securing and holding said spacer to said tape measure tab end portion; said spacer having a normally horizontal axis, from the generally forwardly disposed tape measure tab engaging surface to the generally rearwardly disposed work abutting surface; the thickness of said spacer along the horizontal axis being equal to the desired preselected length.

Additional objects and features will appear from the following description of the invention in which the preferred embodiments are set forth in detail in conjunction with the accompanying drawings.

BRIEF DESCRIPTION OF THE DRAWINGS

For a better understanding of the invention and its operation, reference should be made to the following description making reference to the accompanying drawings, wherein.

DETAILED DESCRIPTION OF THE PREFERRED EMBODIMENT

Figure 1:
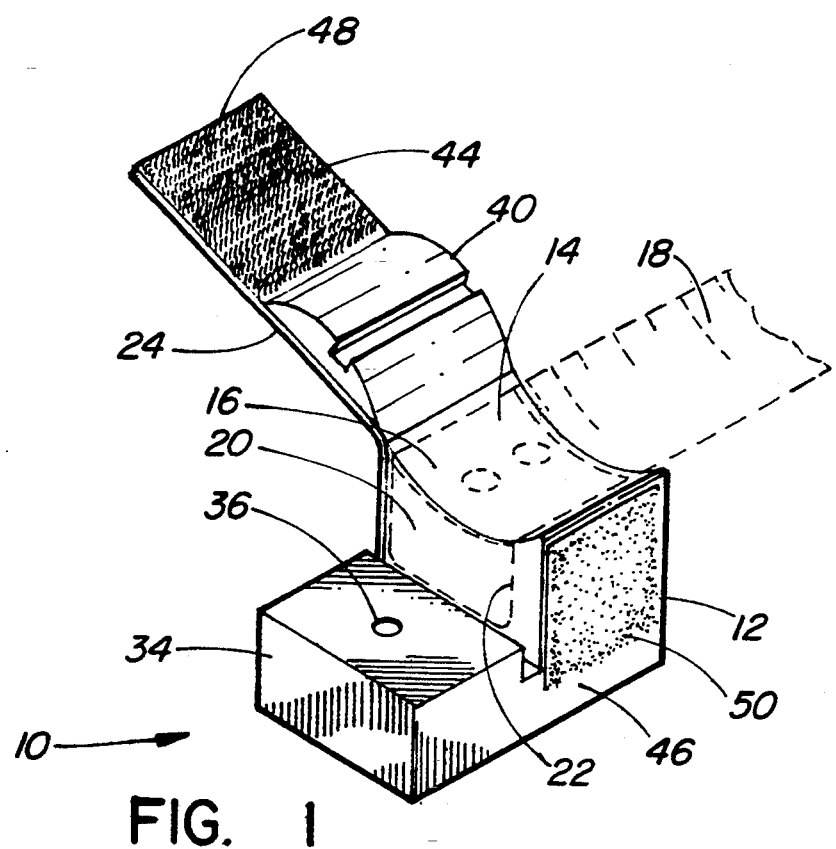
FIG. 1 is a perspective view of the preferred embodiment of the tape measure attachment of the present invention.
Figure 2:
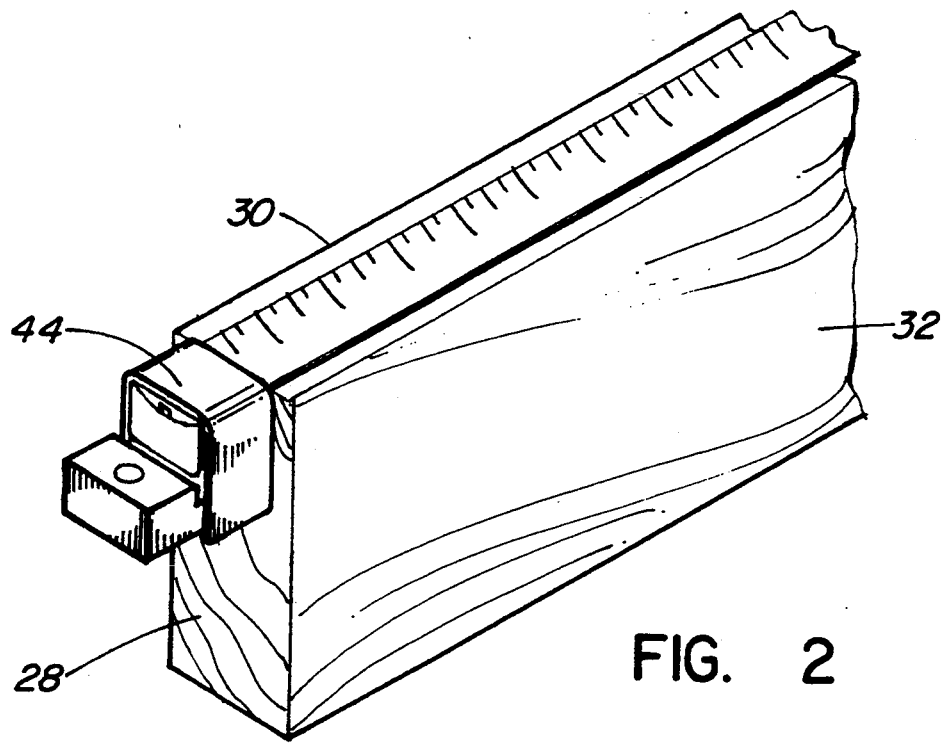
FIG. 2 is a perspective view of the tape attachment of the present invention in use to position the end of a tape measure at a position at the edge of a framing surface.

With particular reference to the drawings, there is illustrated in FIG. 1 a tape measure attachment of the present invention identified by the number 10. The attachment 10 includes a spacer 12 with a generally upper surface 14 adapted for engaging tab end 16 of a standard tape measure 18, a generally forwardly disposed surface 20 for engaging a tape measure tab 22 and a fastening means 24 for detachably securing and holding the spacer to the tape measure tab end. Rear surface 26 abuts the edge 28 of a working surface 30 when the tape measure attachment is positioned at the edge of a framing member 32, as illustrated in FIG. 2. The spacer is of a thickness along its normally horizontal axis, from the generally forwardly defined surface 20 to rear surface 26, that is equal to the pre-selected length by which it is desired to shorten the tape measure, as illustrated in FIG. 2.

It will be apparent to a skilled person reading this description that for the purpose of the functioning of the attachment of this invention any known and suitable fastening means such as a spring mechanism or magnetic attachment may be used and that it is not required that the spacer and fastening means be permanently secured to each other when the attachment is not in use. Indeed, the spacer and fastening means may be completely separate and detachable, the fastening means secured to the spacer only when it is desired to secure the tab end of a tape measure to the attachment of this invention.

Figure 3:
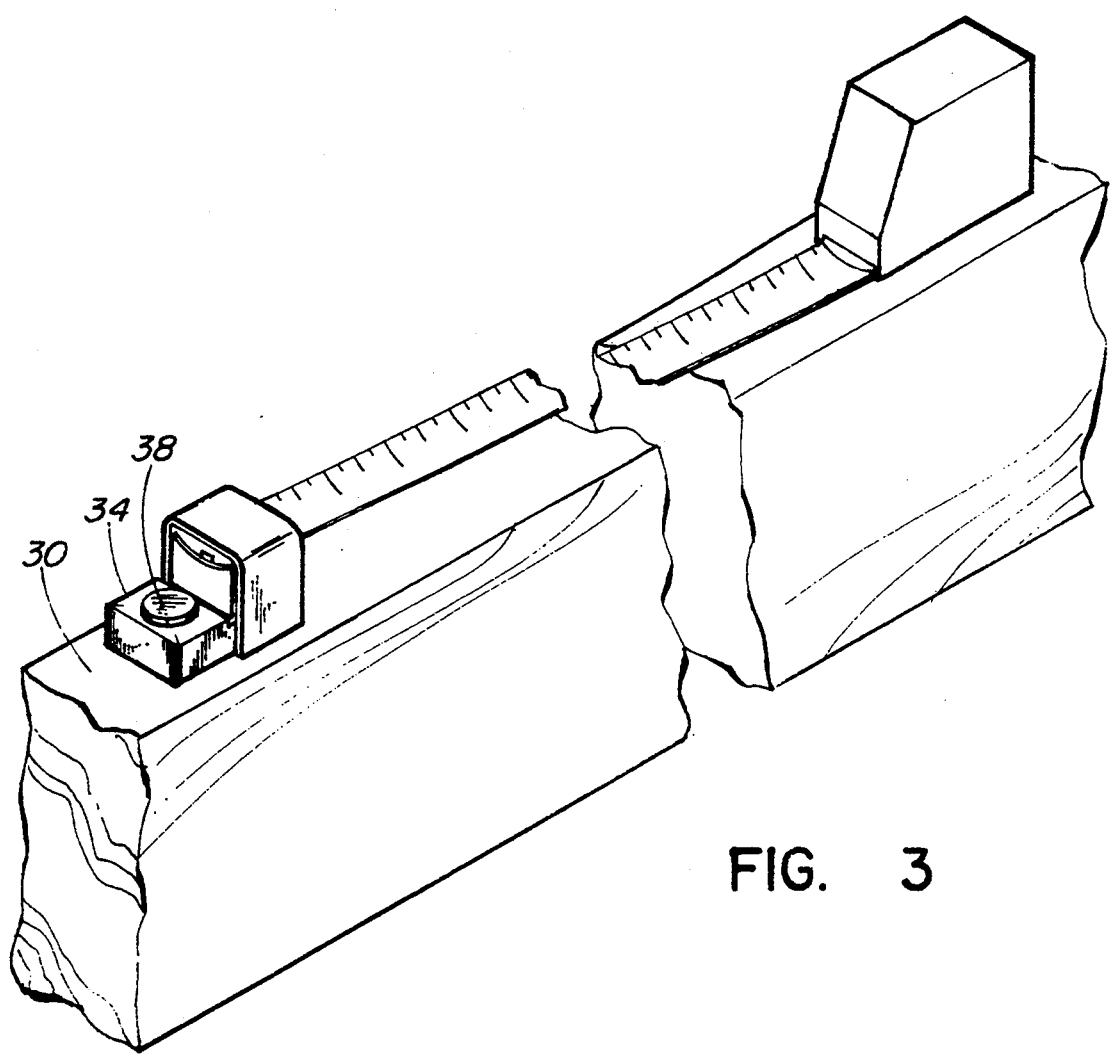
FIGS. 3 and 4 are perspective views of the tape measure attachment of the present invention being used to position the end of a tape measure on a framing surface intermediate to the edges of said surface.
Figure 4:
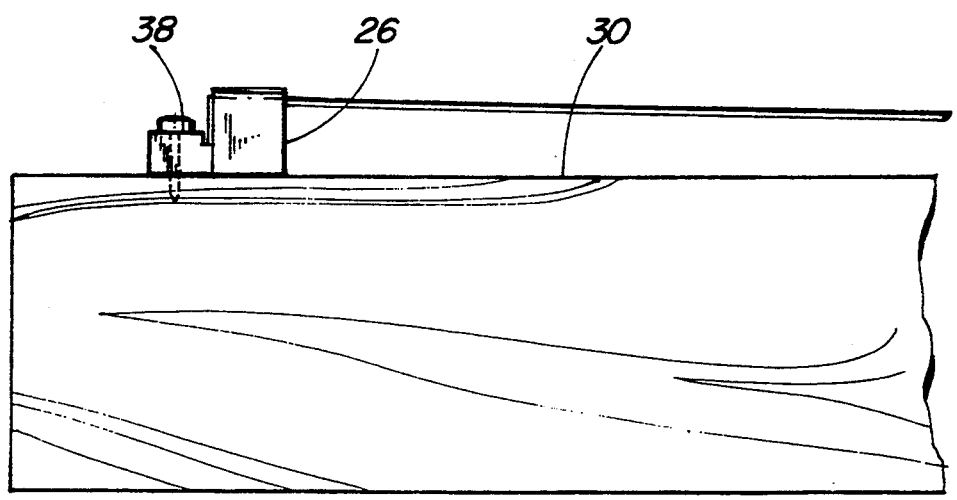

Flange 34 extending forwardly from the spacer 12 has an aperture 36 therethrough for passage of a suitable fastener such as tack 38. By this means, the tape measure attachment may be engaged and secured to a working surface at a position intermediate to its edges, as illustrated in FIGS. 3 and 4.

The lower surface 40 of the fastening means and the upper surface 14 of the spacer may both be flat. However, in one specific embodiment of this invention the attachment 10 includes fastening means and a spacer, the lower surface 40 of the fastening means and the upper surface 14 of the spacer being preferably curved so as to mate convexly-concavely and therebetween engage the end of a standard tape measure of arcuate cross-section.

The fastening means and spacer of the attachment may be secured to one another by any simple means, such as by "Velcro" ® fastening strap 44, whereby the fastening means and spacer may engage therebetween the tab end of a tape measure while mating in the above described manner. Preferably, "Velcro" strap 44 is attached to one of the side surfaces 46 of the spacer and to the fastening means and is of sufficient length so as to provide a free end 48 that will engage with a second complimentary "Velcro" strip 50 on the opposite side surface 46 of the spacer. This achieves mating engagement of the spacer and fastening means thereby securing engagement of the tab end of a tape measure therebetween. Another means of securing the fastening means and spacer is by magnets at free end 48 and side surface 46.

EXAMPLE

The spacer is of a thickness through its normally horizontal axis that is equal to half the thickness of the framing members being positioned at the desired framing intervals on a framing surface. Thereby, when a tape measure tab end is engaged between the spacer and fastening means of the attachment of this invention and the attachment is positioned at the edge of a framing surface, the distance along the said tape measure from the edge of the framing surface to the first framing member position is reduced by half the thickness of the framing member.

Where framing members of 1.5 inches thickness are being positioned along a framing surface then it is desired to use an attachment of this invention that will shorten the tape measure by 0.75 inches. Thus, where such framing members are being positioned along a framing surface, commencing from its left most end or edge, at specified framing intervals, say every 16 inches, the distance along the framing surface for the first framing interval from the edge will correspond to the exact position of the left side of the first said framing member, where it abuts the framing surface, thereby simplifying the centering of the framing member with accuracy.

It will be apparent to a skilled person reading this description that a kit of any number of tape measure attachments of this invention, each attachment having a thickness corresponding to half the thickness of a standard framing member, can be made available.

Subsequent framing members may be centered with accuracy along the framing surface in a like manner. First a line is drawn on the framing surface at the position of the desired first framing interval, say at 16 inches, as provided by use of the device of this invention. Then, by measuring on the tape measure from this line as many subsequent framing intervals as are required or until the end of the tape measure is reached and using the measured framing intervals to mark the desired subsequent framing member positions on the framing surface with a line by any suitable means, such as by pencil, additional framing members can be centered with accuracy and ease. If required, for the marking of additional framing intervals, the device of this invention with the tab end of a tape measure engaged therein can be repositioned and secured to the framing surface such that the position of the measuring tape tab corresponds to the marked position of the last marked framing interval. Continuing in this manner, any number of framing members can be centered with simplicity and accuracy.

The foregoing is illustrative only of the principles of the device of this invention and it is recognized that certain modifications and changes will occur to those skilled in the art. It is not desired to limit the invention to the exact foregoing description and to wood frame contsruction. All variations that are equivalent to the device disclosed and various types of framing using other materials such as metal are intended to be encompassed by the invention herein.

The embodiments of the invention in which an exclusive property or privilege is claimed are as follows:

1. A tape measure attachment adapted to be secured to a tab end portion of a tape measure for the purpose of shortening the tape measure by a pre-selected length, comprising a spacer with a generally upper tape measure tab end portion engaging surface, a generally forwardly disposed tape measure tab engaging surface and a generally rearwardly disposed work abutting surface; and fastening means for detachably securing and holding said spacer to said tape measure tab end portion; said spacer having a normally horizontal axis, from the generally forwardly disposed tape measure tab engaging surface to the generally rearwardly disposed work abutting surface; the thickness of said spacer along the horizontal axis being such that the tape measure attachment is adapted to shorten the length of the tape measure by half the thickness of a 1.5 inch framing member.

2. A tape measure attachment of claim 1 comprising a second fastening means for detachably securing said spacer to a working surface.

3. The tape measure attachment of claim 2 wherein said second fastening means comprises a flange formed with said spacer, said flange including an aperture extending diametrically therethrough for inserting a pointed fastener for detachable securing said spacer to a working surface.

4. The tape measure attachment of claim 1 wherein said spacer comprises a curved upper surface adapted to complement the arcuate cross-section of a standard tape measure and wherein said fastening means is capable of mating with said curved upper surface of the spacer for the purpose of engaging and holding the tape measure tab end portion between said spacer and fastening means.

5. The tape measure attachment of claim 4 wherein the said spacer and fastening means are secured to one another by means of a "Velcro" fastening strap.

6. The tape measure attachment of claim 1 wherein said spacer extends downwardly, in a direction perpendicular to the tape, by a depth past the tape which is generally equal to or greater than a width of the tape.

7. A tape measure attachment adapted to be secured to a tab end portion of a tape measure for the purpose of shortening the tape measure by a pre-selected length, comprising:

a spacer with a generally upper tape measure tab end portion engaging surface, a generally forwardly disposed tape measure tab engaging surface and a generally rearwardly disposed work abutting surface;

and fastening means for detachably securing and holding said spacer to said tape measure tab end portion, said fastening means being hingedly attached to said spacer; and closure means for holding said fastening means disposed over said tab end portion such that said tab end portion is held between said fastening means and said spacer;

said spacer having a normally horizontal axis, from the generally forwardly disposed tape measure tab engaging surface to the generally rearwardly disposed work abutting surface; the thickness of said spacer along the horizontal axis being such that the tape measure attachment is adapted to shorten the length of the tape measure by half the thickness of a 1.5 inch framing member.

8. A tape measure attachment of claim 7 comprising a second fastening means for detachably securing said spacer to a working surface.

9. The tape measure attachment of claim 8 wherein said second fastening means comprises a flange formed with said spacer, said flange including an aperture extending diametrically therethrough for inserting a pointed fastener for detachably securing said spacer to a working surface.

10. The tape measure attachment of claim 7 wherein said spacer comprises a curved upper surface adapted to complement the arcuate cross-section of a standard tape measure and wherein said fastening means is capable of mating with said curved upper surface of the spacer for the purpose of engaging and holding the tape measure tab end portion between said spacer and fastening means.

11. The tape measure attachment of claim 10 wherein the said spacer and fastening means are secured to one another by means of a "Velcro" fastening strap.

* * * * *